US008494883B2

(12) United States Patent
Bush

(10) Patent No.: US 8,494,883 B2
(45) Date of Patent: *Jul. 23, 2013

(54) INSURANCE CLAIM PAYMENT CARD SYSTEM

(75) Inventor: Lawrence P. Bush, Chesterfield, MO (US)

(73) Assignee: Meridian Enterprises Corporation, Hazelwood, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/484,769

(22) Filed: May 31, 2012

(65) Prior Publication Data

US 2012/0239439 A1 Sep. 20, 2012

Related U.S. Application Data

(63) Continuation of application No. 10/294,316, filed on Nov. 14, 2002, now Pat. No. 8,204,766, which is a continuation-in-part of application No. 09/930,418, filed on Aug. 15, 2001, now abandoned.

(51) Int. Cl.
*G06Q 10/00* (2006.01)
*G06Q 50/00* (2006.01)
*G06Q 40/00* (2006.01)

(52) U.S. Cl.
USPC .................................. 705/4; 705/2; 705/3

(58) Field of Classification Search
USPC ............................................ 705/2–4
See application file for complete search history.

(56) References Cited

U.S. PATENT DOCUMENTS

| 4,857,716 A * | 8/1989 | Gombrich et al. ............ 235/375 |
| 5,025,372 A | 6/1991 | Burton et al. |
| 5,550,734 A * | 8/1996 | Tarter et al. .................... 705/2 |
| 5,689,100 A | 11/1997 | Carrithers et al. |
| 5,717,595 A | 2/1998 | Rotman et al. |
| 5,890,129 A * | 3/1999 | Spurgeon .......................... 705/4 |
| 6,088,677 A * | 7/2000 | Spurgeon .......................... 705/4 |
| 6,208,973 B1 | 3/2001 | Boyer et al. |
| 6,283,761 B1 * | 9/2001 | Joao .............................. 434/236 |
| 6,615,190 B1 | 9/2003 | Slater |
| 2002/0019749 A1 * | 2/2002 | Becker et al. .................... 705/2 |
| 2003/0018550 A1 | 1/2003 | Rotman et al. |
| 2005/0182660 A1 | 8/2005 | Henley |

OTHER PUBLICATIONS

Patchett, Sharon; "Pre-paid credit cards targeted for teen-agers", The Post-Standard; Syracuse, NY; Jun. 11, 2001, p. 12.*

(Continued)

*Primary Examiner* — Jason Dunham
*Assistant Examiner* — Amber Altschul
(74) *Attorney, Agent, or Firm* — Woodard, Emhardt, Moriarty, McNett & Henry LLP

(57) ABSTRACT

A system for the adjudication of insurance claims, such as automobile repair claims, by an insurance provider is provided. A claim submitted by a policyholder is received is received by the insurance provider. The claim is assigned to an insurance adjuster. The insurance provider receives a determination of a dollar value of the claim from the adjuster, and uses this information to determine how much money to disburse to the policyholder. The insurance provider then issues an account funded with the dollar value of the claim to the policyholder, accessible by the policyholder through a card. As the card is used, the insurance provider collects purchase information, such as information relating to the date, place, and amount of each purchase made on the account. The insurance provider may then collate the purchase information in a database and analyze the data for mathematically significant trends and relationships.

20 Claims, 1 Drawing Sheet

OTHER PUBLICATIONS

Patchett, Sharon; "Pre-paid credit cards targeted for teenagers", The Post-Standard; Syracuse, NY; Jun. 11, 2011, p. 12.*
Bowen, Cathy, "Canada: Smart Card's Cautious Pioneers," Card Technology, New York, Jul. 2001, vol. 6, Iss. 7; pp. 28-31.
Supplemental Nutrition Assistance Program [online], [retrieved on Nov. 26, 2012], Retrieved from http://www.fns.usda.gov/snap/rules/Legislation/about.htm.
Electronic Benefits Transfer (EBT) Status Report [online], [retrieved on Oct. 31, 2012, Retrieved from http://www.fns.usda.gov/snap/ebt/ebt_status_report.htm.
U.S. Appl. No. 09/930,418 Office Action mailed Mar. 2, 2006.
U.S. Appl. No. 09/930,418 Response to Office Action submitted Aug. 2, 2006.
U.S. Appl. No. 09/930,418 Final Office Action mailed Mar. 23, 2007.
U.S. Appl. No. 09/930,418 Response to Final Office Action submitted Jun. 25, 2007.
U.S. Appl. No. 09/930,418 Final Office Action mailed Sep. 7, 2007.
U.S. Appl. No. 09/930,418 Appeal Decision mailed Dec. 7, 2009.
U.S. Appl. No. 12/703,451 Office Action mailed Feb. 2, 2011.
U.S. Appl. No. 12/703,451 Resonse to Office Action submitted May 2, 2011.
U.S. Appl. No. 12/703,451 Final Office Action mailed Jul. 26, 2011.
U.S. Appl. No. 12/703,451 Response to Final Office Action submitted Jan. 26, 2012.
U.S. Appl. No. 12/703,451 Office Action mailed Oct. 10, 2012.
U.S. Appl. No. 12/703,451 Response to Office Action submitted Apr. 9, 2013.

* cited by examiner

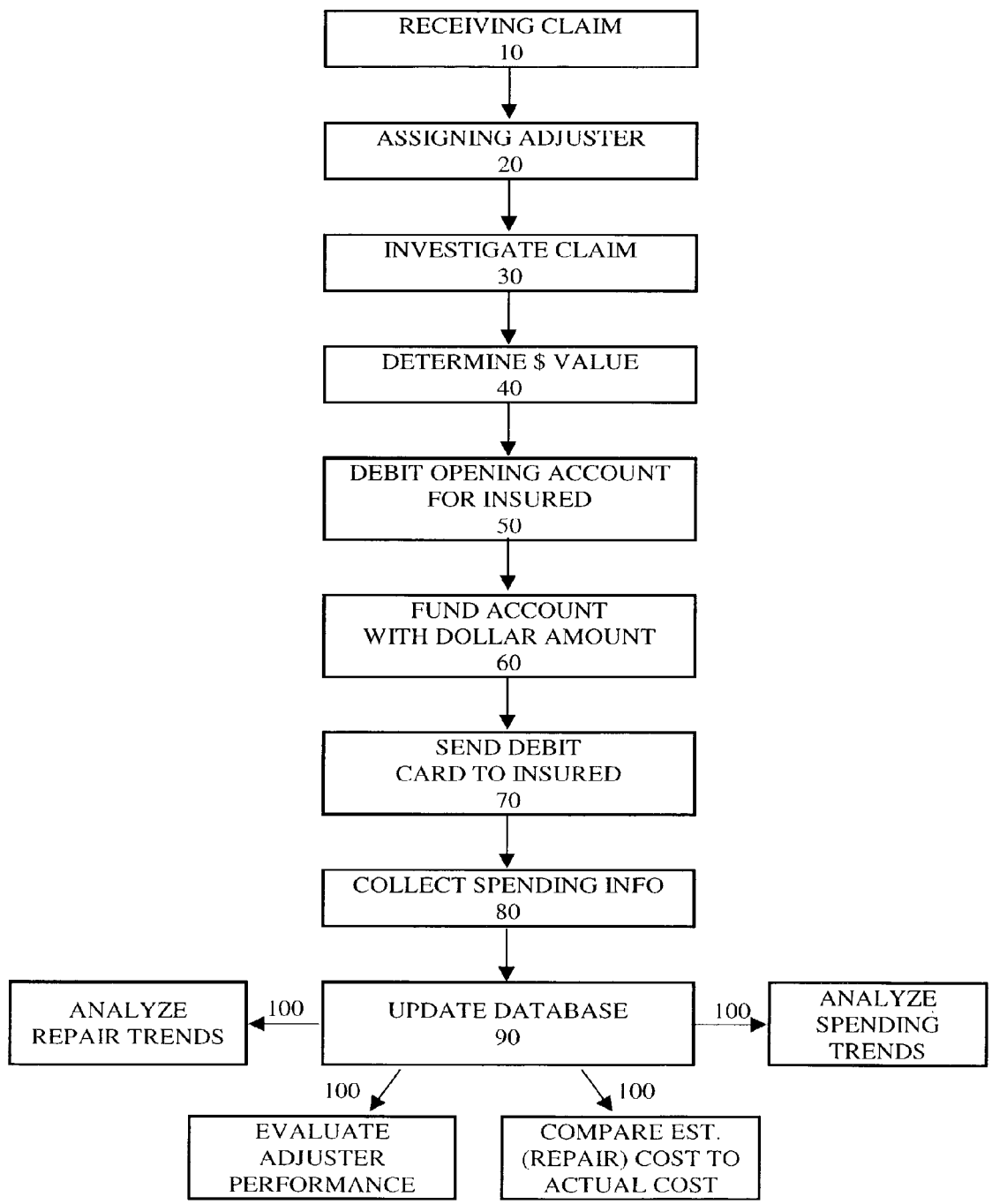

INSURANCE CLAIM PAYMENT CARD SYSTEM

REFERENCE TO RELATED APPLICATIONS

The present application is a continuation of U.S. patent application Ser. No. 10/294,316, filed Nov. 14, 2002 now U.S. Pat. No. 8,204,766. U.S. patent application Ser. No. 10/294,316 is a continuation-in-part of U.S. patent application Ser. No. 09/930,418 filed Aug. 15, 2001 now abandoned. All of the above-identified patent applications are incorporated by reference in their entirety.

TECHNICAL FIELD OF THE INVENTION

The present invention relates generally to systems and methods for data processing, and more particularly, to a system and method for administration of insurance claims adjustment utilizing a card for payment of claims.

BACKGROUND OF THE INVENTION

It is common for people to purchase insurance in order to spread the risk of financial liability resulting from the occurrence of an event covered by the insurance policy. For example, it is very common for a person to carry automotive insurance coverage, such that some or all expenses associated with an accident, such as repair of the vehicle, will be borne by the insurance company. In fact, in many places such insurance coverage is mandated by law. Such insurance coverage may be offered by insurance companies because, while the benefits paid by the insurance company for some of the insureds will greatly exceed the amounts paid by these insureds for their policies, the majority of the insureds will pay more for their policies than they will receive in benefits from the insurance company. In this way, the total group of insureds is spreading the risk for liability for the entire group's repair costs.

Whenever an insured desires to receive payment from the insurance company to cover some or all of the cost of automotive repair, the insured is required to submit a claim to the insurance company. This claim is then evaluated by the insurance company, which then makes a determination as to whether the insurance company will provide a payment and, if so, how much of the total cost of the repair bill the insurance company will pay for. For example, many insurance policies include deductibles which must be met by the insured before the insurance company begins to assume financial liability for repairs. Such deductibles can be on a per incident basis, a yearly basis, etc. After the deductible has been met by the particular insured, some policies still do not pay the total remaining cost of the repair, but instead may provide payments on a cost-sharing basis with the insured. Other factors which may have a bearing upon the amount paid by the insurance company include per-occurrence maximums and maximums tied to the current "blue book" value of the vehicle, both of which will cap the total liability of the insurance company. Because of these factors, claims submitted to an insurance company must go through a process known as claim adjudication or adjustment. In the claim adjudication process, the insurance company evaluates all of the claim data submitted by the insured and makes a determination as to what benefits the insurance company is willing to pay to the insured. The results of the claim adjudication process are typically communicated to the insured by means of a printed explanation of benefits (EOB) statement.

Insurance companies process millions of claims a year; automotive insurance alone is a multi-billion dollar industry. For each claim, an insurance adjuster must first determine the estimated value of the damage to the vehicle, which is presumably substantially the cost of the repair. The insurance company then cuts a check in that amount (less any applicable deductibles, etc . . . ) and mails it to the insured. Once the insured receives the check, it is up to the insured to decide what to do with the money. The insured may decide to repair the vehicle or they may decide it is preferable to live with the damage to the vehicle and use the money for other purposes. Once the check is cashed, the insurance company has no way of knowing how the money was spent, or even how much the repairs actually cost. Information regarding the actual repair cost (i.e., how accurate the adjuster was) would be of particular interest to the insurance company, as well as would information relating to the demographics regarding individual and regional spending patterns and repair choices.

Each check cut by the insurance company has a processing and delivery cost associated therewith. There is also a "float" period between when the check is cashed and when the money is spent. During the float period, the money resides with the insured. The cost of a typical claim is relatively high for payer organizations (i.e. insurance companies)—an average of several dollars per claim to price, adjudicate, and issue a check and an EOB. In addition, there is a loss of interest dividends during the "float" period, which is small on a per claim calculation but great in aggregate. Furthermore, there are instances where the claim amount adjudicated by the insurance company is greater than the actual cost to repair the automobile, which represents a loss to the insurance company. The result is that the costs associated with claims processing and adjustment are non-trivial for the insurance company. Even at its most efficient, claims processing today is a multi-billion dollar industry.

From the above, it is apparent that the claims adjudication process adds a significant amount of cost to the insurance provider, which is reflected as rising premiums for the consumer.

Moreover, the current adjudication process provides little feedback to the insurance provider regarding how claim checks cut to the insured are spent. There is therefore a need for an insurance claim adjudication process that is much more administratively efficient than the current system and which provides some feedback information to the insurance company. A solution to this problem has thus far eluded those skilled in the art.

SUMMARY OF THE INVENTION

The present invention provides an insurance claim disbursement system adapted to provide feedback information relating to the spending patterns of the claimants. According to one aspect of the invention, a method for administering insurance claims and monitoring claim-related data in a database is provided. The method includes providing a database in which to store information relating to the spending patterns of the claimants. Claims from insured policyholders are received by an insurance provider. The insurance provider first investigates the claim, and then determines a dollar value to attach to the claim. A card-accessible account is funded with the dollar value of the claim and issued to the insured. As the card account is used to make purchases, purchase information from the card account is collected. The collected information is entered into the card account database, and subsequently analyzed to investigate such phenomena as spending habits of policyholders (both individually and in aggregate), the accuracy of the insurance investigators upon whose reports the dollar value determination of the claim was made, average prices for goods and services purchased by the policyholders, and the like.

One object of the present invention is to provide an improved insurance claim investigation and disbursement system. Other objects and advantages of the present invention will be apparent from the following description of the preferred embodiment.

BRIEF DESCRIPTION OF THE DRAWINGS

FIG. 1 is a schematic process diagram of a preferred embodiment insurance claim submission, adjudication and payment system of the present invention.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The insurance claims adjudication system according to one aspect of the present invention will be described with reference to FIG. 1. Referring to FIG. 1, there is illustrated a preferred embodiment process flow of the system and method of the present invention. The preferred embodiment is illustrated herein using an accident claim against an automobile insurance policy as the exemplary model of how the system works; however, as discussed in greater detail hereinbelow, those of ordinary skill in the art will recognize that the system and method of the present invention will lend itself for use in a variety of different applications across the insurance gamut as well as in other business applications. Other insurance scenarios include, for example, but not by limitation, property damage (i.e., houses, vehicles, personal property and the like), fire and/or theft loss, mysterious disappearance, death or disability benefits, medical treatment, and the like. Also, the system and method of the present invention could be readily applied to third party claims, such as wherein the policyholder is sued for damages resulting from negligence, trespass, and the like. References to automobile insurance, automobile accidents, car repair bills, repair shops, mechanics, and the like are presented herein for illustrative purposes and are not intended to limit application of the present invention to any particular type of insurance or business.

FIG. 1 illustrates one embodiment process of the present invention, an insurance claims adjudication system using a debit card, credit card, smart card or the like as a vehicle for disbursing compensations to policyholders having valid and adjusted claims. It should be noted that while the following example contemplates payments made to policyholders, the system and method of the present invention also fully encompasses payments made to anyone arising from an insurance claim, including non-policyholder insureds (such as spouses, dependent children, etc . . . ), injured third party claimants, and the like. Likewise, while the following example discusses an insurance company as the payee, the present invention also encompasses a non-insurance company claim service provider as the payee.

Beginning at step 10, the insurance company receives a claim from an insured policyholder. For the purposed of this example, the claim will be taken to be damage to an automobile covered by an insurance policy, in the form of a dented fender. Upon receipt of the claim from the policyholder, the insurance company assigns an adjuster (step 20) to investigate the claim. The adjuster is presumed to have some quantum of expertise in the field, and is capable of making an independent evaluation of the claim by assessing the degree of damage to the car, the complexity and feasibility of the repair, and the potential costs involved. In the next step, step 30, the adjuster proceeds to investigate the claim. Upon completion of his investigation, the adjuster will make a determination of the value of the claim (step 40). The adjuster will take into account the degree of damage to the car and estimate the cost of the repair. While different adjusters working for different insurance companies will be subject to different criteria and parameters imposed by their respective employers, the main points of the adjustment process are essentially the same. The adjuster will arrive at a dollar value to assign to the claim in step 40.

Once a non-zero dollar value for the claim has been determined, the insurance company will open a card-accessible account, such as a debit card account for the policyholder, according to step 50. The card account may be managed through a bank or other like financial institution, through a non-bank third party, or may be managed directly through the insurance company. In a preferred embodiment, the card account is a debit card account, wherein the associated debit card accesses a bill-on-redemption debit card account managed by a third party, where funds are routed from the insurance company to the third party through an automated clearinghouse (ACH) each day to pay for that day's claim redemptions through the debit card accounts. Other alternate embodiments contemplate the use of other types of accounts, such as charge or credit card accounts. The third party making the payments would therefore receive the benefit of temporarily holding the money for each funded account (the "float") until the card is actually used. This could represent a significant benefit, since the third party company could easily be in receipt of millions of dollars of float at any given time. In step 60, the insurance company will fund the debit account with the dollar value of the claim. The amount assigned to any single debit card may be limited according to claims of a certain predetermined type, to claims of a certain type, or the like. In step 70, the insurance company will issue a debit card to the insured upon which the repairs may be charged.

According to step 80, the insurance company collects information regarding to how the debit account was used. Information so collected includes how many payments were made on the account, how much each payment was for, who each payment was made to, when each payment was made, how much money currently remains in the account, and the like. This information may be readily entered into one or more databases maintained by the insurance company. This data entry process is step 90.

It should be understood that the database may be integrated into a system of the insurance provider or, alternatively, the database may be a stand alone computer system that is connected directly to the insurance providers computer system, connected to a local area network or connected to a global computer network. The database may also be provided and maintained by the financial institution or non-bank third party providing and managing the debit account, if it is not managed directly by the insurance provider. The database may also be a stand alone computer system managed by a third party for the insurance providers or for the debit account managers, if any.

Preferably, the data collection and entry processes 80 are automated, and more preferably the data collection and entry are done as a computer-to-computer communications step over secure lines, such as via modem or networked computers (i.e., for example, a global computer network). The data may then be collated and analyzed according any desired mathematical/statistical models that may be of interest at step 100. In other words, once collected, the spending information may be used by the insurance company as it sees fit.

For example, while it is assumed that the policyholder will use the debit card to pay the repair bill, this is not always the case. In some instances, the damage may be minor or merely cosmetic, and the policyholder may decide that it is more advantageous to live with the reduced value of the damaged vehicle and use the claim money for other things. In other instances, the policyholder may desire to keep the car until it wears completely out, making the car's resale value moot and minor repairs less urgent. In still other instances, the policyholder may have already paid for repairs out of pocket, and the claim money is merely reimbursement. In any event, the insurance company may have an interest in collecting information 80 regarding how the money it disburses to the policyholder is spent, including where it is spent, upon what it is spent, and when/how soon it is spent. By analyzing spending trends 90, the insurance company may gain better insight into the individual policyholder's custom wants and needs, as well as those of certain classes of policyholders in aggregate. The insurance company may therefore better position itself to take advantage of heretofore unknown or underestimated business opportunities while simultaneously better serving its customers.

Another point of interest to the insurance company is the accuracy of the adjuster. The insurance company has a strong interest in assessing how accurate their adjusters are, since the adjuster's assessment of a claim directly influences how much the insurance company pays out for that claim. If the adjuster consistently overestimates the value of claims, the insurance company overpays the policyholders and consistently looses money. Likewise, if the adjuster consistently underestimates the value of claims, the result is cumulative alienation of existing policyholders, as well as repair shops and mechanics, which can lead to a bad reputation for the company, decreased business, and, again, lost revenues for the company. Therefore, the insurance company has an interest in making sure the adjusters are performing according to the insurance company's expectations. Unlike in the case of a check sent to the policyholder, if a debit card is used to pay for repairs, the actual cost of the repair bill is easy to learn and track. The collected information may be readily collated by adjuster and analyzed 90 to access the individual adjuster's accuracy.

It should be recognized that this system will work with any type of adjustment process wherein money is disbursed directly to the claimant, and is not limited to automobile insurance and/or automobile repairs.

According to another embodiment of the present invention, insurance refunds and/or rebates are disbursed via debit card accounts, rather than through conventional bank checks. Once again, this allows the insurance company to monitor, record, and analyze data indicative of the spending habits of its clientele.

According to still another embodiment of the present invention, the purchase information collected in the database is used identify service providers that could be defrauding the insurance company and its clientele. The data may be analyzed 100 to identify providers whose charges vary beyond a threshold amount for the same or similar services or who consistently charge substantially more than their competitors for the same services. While not conclusive proof of misconduct, such information could be sufficient to trigger an investigation into the business practices of suspect providers.

According to yet another embodiment of the present invention, the debit account may be programmed to expire after a predetermined length of time. For instance, the debit account may be programmed to expire 30 days after its value decreases below a certain threshold limit, such as, for example, one dollar. The remaining funds may be sent to the policyholder automatically, upon request, applied to future premiums, or otherwise disposed. Alternately, the maximum value of the debit account may be capped at some convenient amount as a theft prevention measure (i.e., loss or theft of the debit card). Large claims would then require a plurality of accounts opened and debit cards issued to the claimant.

It will be understood by those skilled in the art that the bill-on-redemption manner of loading a debit or credit card product described hereabove is accomplished by loading points onto the card as a non-monetary transaction and thereby creating an open-to-buy limit on the card. When the card holder uses the card to make a purchase, the points are redeemed and the merchant is paid in the manner further described previously, thereby enabling the sponsoring company making the payments to use the funds until the settlement process occurs.

As described hereinabove, the insurance claims adjudication system of the present invention applies to a variety of insurance scenarios such as disability benefits and medical treatment. A specific example of disability benefits includes payments to an employee through the employer's disability policy. A specific example of payments for medical treatment includes payments to an employee for Workman's Compensation claims.

In still another embodiment of the present invention, insurance payments that require ongoing payments for a period of time are disbursed as loads onto a debit or credit card product. As one example, employee disability benefits as described previously are disbursed to the employee as ongoing loads onto the debit or credit card product that was issued to them for payment of the benefits. This eliminates the need to receive checks through the mail and deposit the checks.

While the invention has been illustrated and described in detail in the drawings and foregoing description, the same is to be considered as illustrative and not restrictive in character, it being understood that only the preferred embodiment has been shown and described and that all changes and modifications the come within the spirit of the invention are desired to be protected.

What is claimed is:

1. A method for facilitating the disbursement of claim payments, comprising the steps of:
   (a) receiving from an insurance provider a request to issue a bill-on-redemption card account loaded with a value corresponding to at least a portion of a dollar value of a claim;
   (b) issuing a bill-on-redemption card and corresponding account loaded with a value corresponding to at least a portion of said dollar value of the claim;
   (c) receiving purchase information relating to a purchase, wherein the purchase is made using the card associated with the bill-on-redemption card account, and wherein the purchase information includes a purchase price, and;

(d) deducting at least a portion of the purchase price from the value in the bill-on-redemption card account.

2. The method of claim 1, further comprising the step of:
(e) issuing payment to a merchant for at least a portion of the purchase price.

3. The method of claim 1, further comprising the steps of:
(e) entering the purchase information into a database.

4. The method according to claim 3, further comprising the step of:
(f) using the database to review purchase trends.

5. The method according to claim 4, further comprising the step of:
(g) using the database to review insurance investigations for accuracy.

6. The method according to claim 1, wherein the card account is a debit card account.

7. The method according to claim 1, wherein the card account is a credit card account.

8. The method according to claim 1, wherein the claim relates to disability payments.

9. The method according to claim 1, wherein the claim is an insurance claim.

10. The method according to claim 1, wherein the claim relates to an automobile accident.

11. The method according to claim 1, wherein the claim relates to medical treatment.

12. The method according to claim 1, wherein the claim relates to death benefits.

13. The method according to claim 1, wherein the claim relates to property damage.

14. The method according to claim 1, wherein the claim relates to property loss.

15. The method according to claim 1, wherein the claim relates to theft.

16. The method according to claim 1, wherein the purchase information includes a time of purchase.

17. The method according to claim 1, wherein the purchase information includes a place of purchase.

18. The method according to claim 1, further comprising the step of:
(e) closing the account after a predetermined amount of time.

19. The method of claim 18, further comprising the step of:
before step (e), reimbursing a card account recipient any money remaining in the account.

20. The method of claim 1, wherein the value loaded in the bill-on-redemption card account is capped at a predetermined limit as a theft prevention measure.

* * * * *